United States Patent [19]
Park

[11] Patent Number: 5,984,602
[45] Date of Patent: Nov. 16, 1999

[54] REVERSIBLE THREADED FASTENER SYSTEM

[76] Inventor: Robert M. Park, 6014 Kensington, Detroit, Mich. 48224

[21] Appl. No.: 09/153,004

[22] Filed: Sep. 14, 1998

[51] Int. Cl.$^6$ .............................. F16B 37/08; F16B 39/24
[52] U.S. Cl. .......................... 411/154; 411/432; 411/544; 411/545
[58] Field of Search .................................... 411/120, 121, 411/149, 150, 154, 161, 432, 533, 544, 545

[56] References Cited

U.S. PATENT DOCUMENTS

| | | | |
|---|---|---|---|
| 1,302,858 | 5/1919 | Sack | 411/149 X |
| 1,878,425 | 9/1932 | Olson | 411/154 |
| 3,263,727 | 8/1966 | Herpolsheimer | 411/149 X |
| 4,377,361 | 3/1983 | Frieberg . | |
| 4,790,703 | 12/1988 | Wing . | |
| 5,180,265 | 1/1993 | Wiese | 411/150 |
| 5,203,656 | 4/1993 | Mc Kinlay . | |
| 5,362,111 | 11/1994 | Hargin | 411/121 X |
| 5,499,893 | 3/1996 | Thurston et al. . | |
| 5,564,875 | 10/1996 | Matthews . | |
| 5,626,449 | 5/1997 | McKinlay | 411/149 |

*Primary Examiner*—Neill Wilson
*Attorney, Agent, or Firm*—Peter D. Keefe

[57] ABSTRACT

A reversible threaded fastener system which provides holding of a nut in a fully conjoined state with respect to a bolt, yet the interrelationship therebetween is fully reversible and is accomplished without friction and without inelastic deformation. Included is a bolt having a threaded shank, a nut having a threaded bore for being threadably engaged on the threaded shank of the bolt, and a washer non-rotatably interfaced with the shank and provided with a plurality of radial washer waves. The washer is held in non-rotatable relation with respect to the bolt by the shank and the bore of the washer being mutually asymmetric. In a first preferred embodiment, the inner face of the nut is provided with a plurality of radial nut waves which correspond to the washer waves, and the washer is resiliently deformable. In a second preferred embodiment, the nut is provided with a plurality of radial nut waves which correspond to the washer waves, the washer is not resiliently deformable, and the nut is resiliently deformable. In a third preferred embodiment, the nut is provided with a plurality of radial nut waves which correspond to the washer waves, the washer is not resiliently deformable, the nut is not resiliently deformable, and the head of the bolt is resiliently deformable.

19 Claims, 5 Drawing Sheets

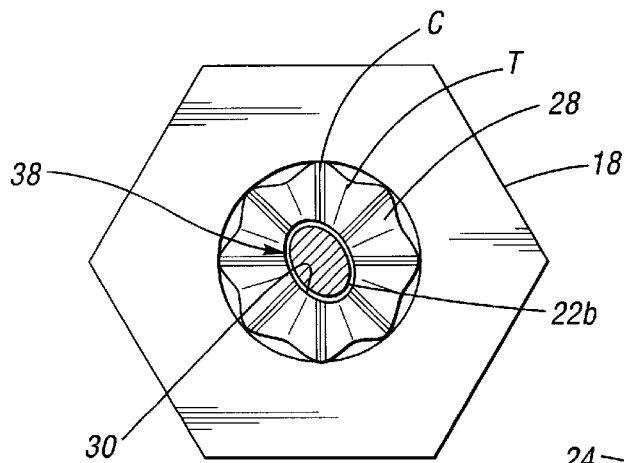
Fig. 4
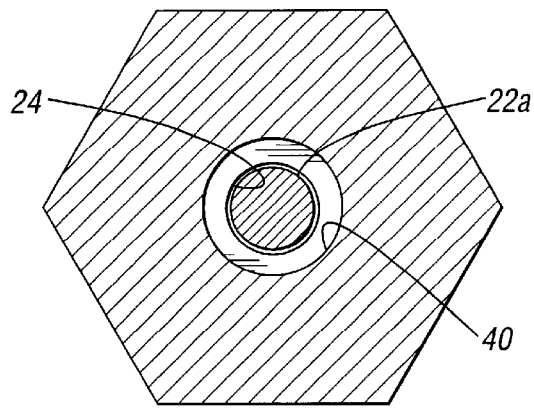
Fig. 5
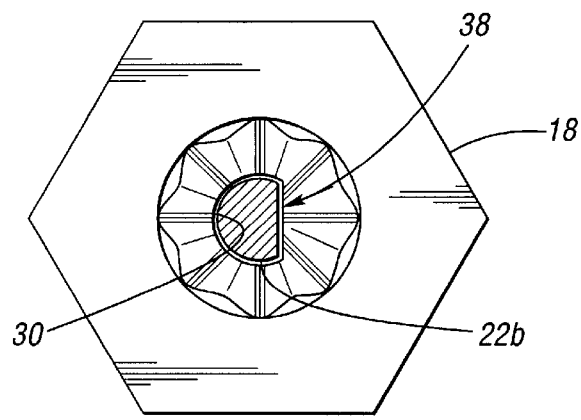
Fig. 6
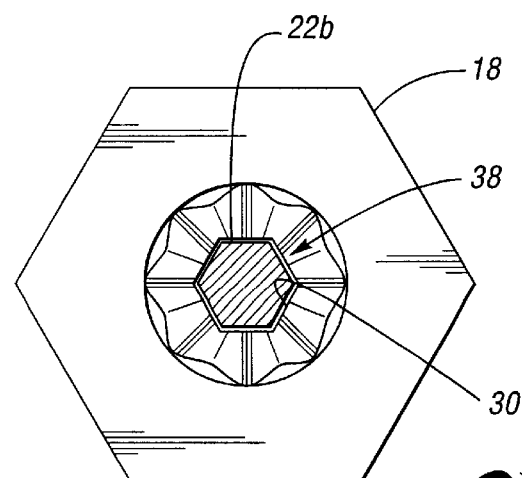
Fig. 7
Fig. 8

REVERSIBLE THREADED FASTENER SYSTEM

BACKGROUND OF THE INVENTION

1. Field of the invention

The present invention relates to threaded fastener systems, wherein threaded components thereof are mutually threadingly engaged. More particularly, the present invention relates to a threaded fastener system utilizing reversible deformity to provide potential energy well conjoinder of the threaded components thereof.

2. Description of the Prior Art

Threaded fastener systems are well known in the art. The best example of threaded fastener systems is a bolt having a threaded shank and a nut having a central threaded bore which is threadably engageable on the threaded shank. It is a well known problem that in order to assure that the nut will not unthread in relation to the bolt, the nut must be tightly engaged on the threads of the bolt so that friction with respect to the threads and the face of the nut against a workpiece being fastened by the threaded fastener will hold the nut in place. Unfortunately, this tightening can compromise or deface the workpiece, and under vibratory conditions the nut may reverse thread, possibly leading to catastrophic failure of the connection.

It is known that a nut may be retained in a fully conjoined state with respect to a bolt by lock washers. Lock washers are of two major types, split washers and toothed washers. Lock washers retain a nut in a fully conjoined state by application of resilient axial force (that is, a force directed parallel to the shank axis of the bolt) which enhances the aforesaid friction engagement, and further provides inelastic deformation at the nut and the workpiece by operation of the edge of the split in split washers or of the teeth in toothed washers tending to dig thereinto. While lock washers have become very common, they still rely primarily on friction holding and the irreversibility of deformation results in scarring, which, itself, may be impermissible.

It is further known to retain a nut in a fully conjoined state with respect to a bolt by positive prevention of rotation. For example, a cotter pin may be placed through a hole in the shank at the outer face of the nut (by outer face is meant the face opposite the inner face which is in abutting contact with the workpiece). Further for example, an adhesive may be used to adhere the nut with respect to the bolt. These techniques are cumbersome, add weight or prevent easy disassembly.

Still further for example, the nut may be subjected to inelastic distortion of its threads while being threaded onto the shank, thereby essentially forcing the nut onto the bolt and inhibiting its reverse rotation.

In that the foregoing methodologies have short comings, what remains needed in the art is a structural arrangement which provides holding of a nut in a fully conjoined state with respect to a bolt, yet the interrelationship therebetween is fully reversible and is accomplished without inelastic deformation.

SUMMARY OF THE INVENTION

The present invention is a reversible threaded fastener system which provides holding of a nut in a fully conjoined state with respect to a bolt, yet the interrelationship therebetween is fully reversible and is accomplished without friction and without inelastic deformation.

The reversible threaded fastener system according to the present invention includes a bolt having a threaded shank, a nut having a threaded bore for being threadably engaged on the threaded shank of the bolt, and a washer non-rotatably interfaced with the shank and provided with a plurality of radial washer waves. The washer is held in non-rotatable relation with respect to the bolt by the shank and the bore of the washer being mutually asymmetric.

In a first preferred embodiment, the inner face of the nut is provided with a plurality of radial nut waves which correspond to the washer waves, and the washer is resiliently deformable. As the nut is threaded onto the shank, the crests and troughs of the nut waves pass over the washer waves, due to the requirement that the washer be rotatively stationary with respect to the bolt. When the nut reaches a fully conjoined state on the bolt, the crests of the nut waves will be seated into corresponding troughs of the washer waves (and the crests of the washer waves will be similarly seated into corresponding troughs of the nut waves). At this relative position, the crests-in-troughs interrelationship creates a potential energy well which must be overcome in order for the nut to reverse thread; that is, in order for the nut to turn, the crests must move out from the troughs and over each other during which process the washer must be increasingly deformed. Because the washer must be increasingly deformed as the crests move out from the troughs, an energy input is required. It is this energy input requirement that is responsible for the potential energy well situation that retains the nut in place on the bolt even in the face of vibratory conditions. And, this is so even wherein the nut is not tightly engaged on the bolt, since it is elastic deformation rather than friction that is at work to retain the nut in place on the bolt.

In the first preferred embodiment, it is preferred for the nut to include a recess having the nut waves, wherein the recess receives therein the washer, and wherein adjacent the recess is an annular flange for directly abutting a workpiece when the nut is in the fully conjoined state.

In a second preferred embodiment, the nut is provided with a plurality of radial nut waves which correspond to the washer waves, the washer is not resiliently deformable, and the nut is resiliently deformable. In a third preferred embodiment, the nut is provided with a plurality of radial nut waves which correspond to the washer waves, the washer is not resiliently deformable, the nut is not resiliently deformable, and the head of the bolt is resiliently deformable.

Resilient deformation in response to crests of washer waves interferingly abutting crests of nut waves so as to permit the crests of the washer waves to pass over the crests of the nut waves may be provided by any resiliently deformable agency. For example, not only may the washer, the nut, or the bolt have resiliently deformability, the workpiece, itself may provide resilient deformabilty. For example, the workpiece may be composed of a resiliently deformable material, or a resiliently deformable material may abut the workpiece on either side of therebetween.

Accordingly, it is an object of the present invention to provide a reversible threaded fastener system that retains a nut threadably engaged on a bolt in a predetermined disposition by operation of elastic deformation.

It is an additional object of the present invention to provide a reversible threaded fastener system wherein a resilient radial wave interaction provides a plurality of potential energy wells for retaining a nut with respect to a bolt.

It is a further object of the present invention to provide a reversible threaded fastener system that retains a nut threadably engaged on a bolt in a predetermined disposition without scarring for irreversible deformation.

These, and additional objects, advantages features and benefits of the present invention will become apparent from the following specification.

BRIEF DESCRIPTION OF THE DRAWINGS

FIG. 4 is a partly sectional view, seen along line 4—4 in FIG. 1.

FIG. 5 is a partly sectional view, seen along line 5—5 in FIG. 1.

FIGS. 6 through 8 depict partly sectional views of alternative asymmetric relationships between the bolt and washer of the reversible fastener system, seen from a vantage as in FIG. 4.

DETAILED DESCRIPTION OF THE PREFERRED EMBODIMENTS

Figure 1:
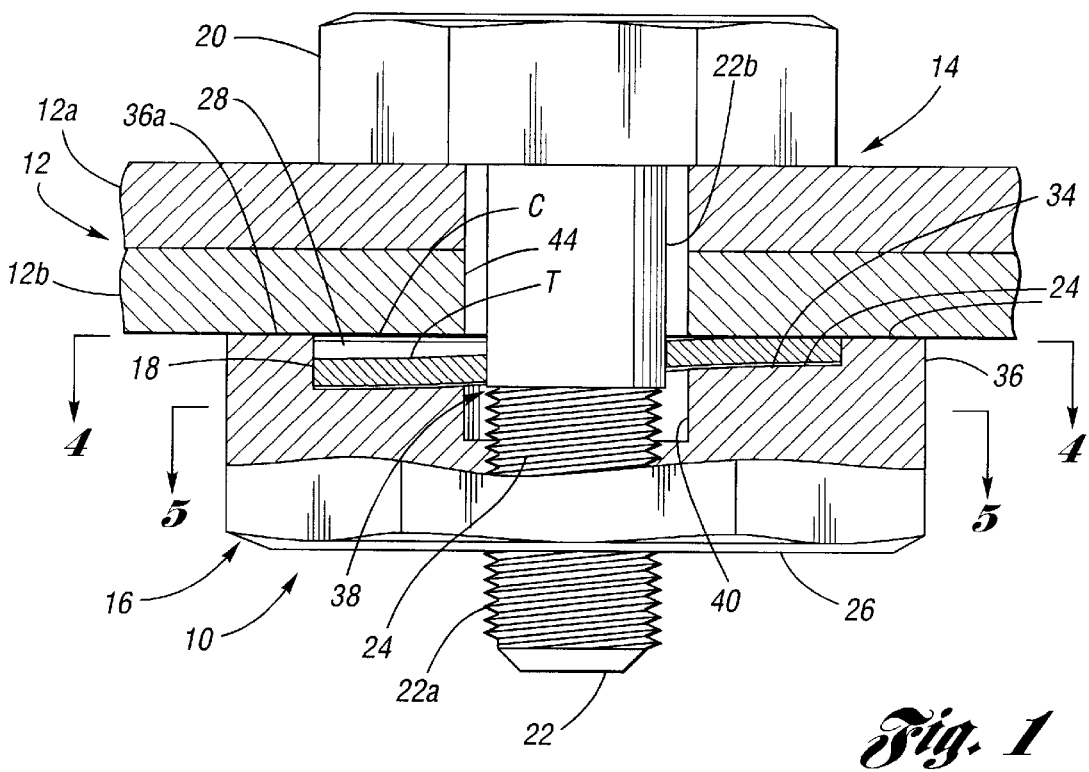
FIG. 1 is a partly sectional side view of a first preferred embodiment of a reversible fastener system according to the present invention.

Referring now to the Drawing, FIG. 1 depicts the reversible threaded fastener system 10 in operation with respect to a workpiece 12, wherein two members 12a, 12b of the workpiece are being joined together by the reversible threaded fastener system.

The reversible threaded fastener system 10 includes a bolt 14, a nut 16 and a washer 18. The bolt 14 has a head 20 and a shank 22 having a threaded portion 22a and an upper portion 22b. The nut 16 has a centrally disposed threaded bore 24 which is threadably engaged on the threaded portion 22a. The nut 16 has an inner face 24 and an opposite outer face 26, wherein at least a portion of the inner face is provided with a plurality of radially oriented nut waves 28. The washer 18 has a center hole 30 and the body thereof is provided with a plurality of washer waves 32. The nut waves 28 are complementary with respect to the washer waves 32, such that crests C are nestable into troughs T.

Figure 2:
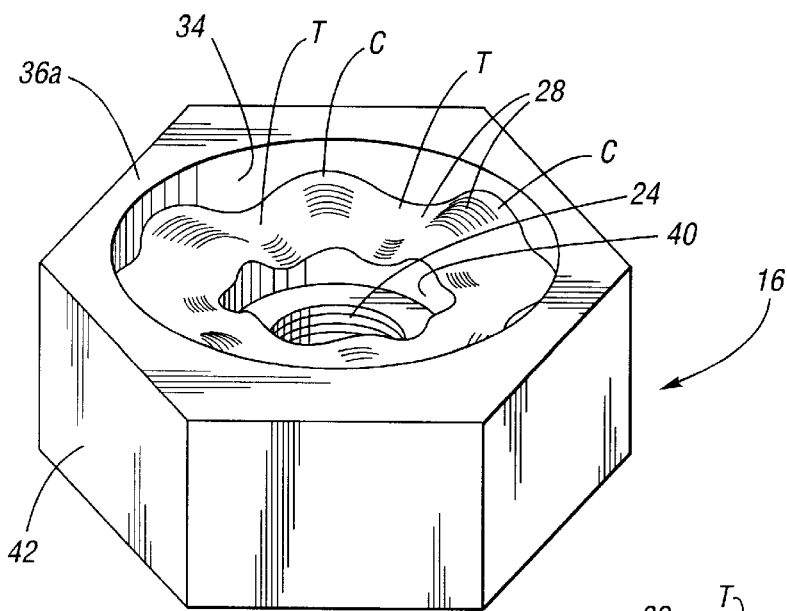
FIG. 2 is a perspective view of a nut according to the first preferred embodiment of a reversible fastener system.

As best shown at FIGS. 1 and 2, it is preferred for the inner face of the nut 16 to include a primary recess 34, wherein the primary recess carries the aforementioned nut waves 28. In this regard, an annular flange 36 is formed upstanding in relation to the primary recess 34, wherein the annular flange has an abutment face 36a for abutting the workpiece 12.

The washer 18 is axially slidable (that is along the shank axis) in relation to the bolt 14; however, the washer is non-rotatable with respect to the bolt. This non-rotation feature is provided by an asymmetric coupling 38 between the bolt 14 and the washer 18. As shown at FIG. 4, an upper portion 22b of the shank 22 is elliptically cross-sectioned, and the hole 30 of the washer 18 is complementarily elliptically cross-sectioned so that the washer is prevented from rotating with respect to the bolt. Alternative configurations of the asymmetric coupling 38 are possible, such as for example (wherein like numerals refer to like functioning parts): a complementary half-moon cross-section shown at FIG. 6; a complementary tri-lobular cross-section shown at FIG. 7; or a complementary multi-sided cross-section shown at FIG. 6.

As shown at FIG. 5, the threaded portion 22a of the shank 22 is cylindrically cross-sectioned. In order for the nut 16 to accommodate the asymmetric cross-section of the upper portion 22b of the shank 22, the nut is provided with a secondary recess 40 concentric to the primary recess 34, wherein the cross-section thereof is at least as great as the widest diameter of the upper portion 22b.

Figure 3:
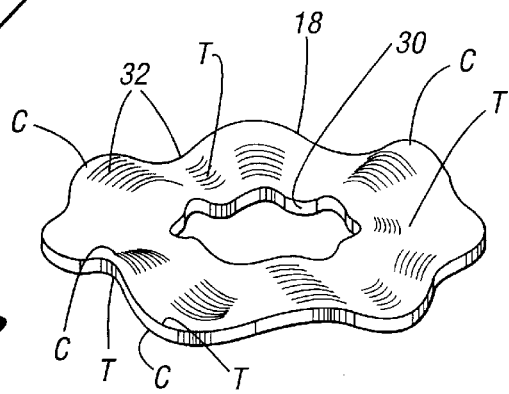
FIG. 3 is a perspective view of a washer according to the first preferred embodiment of a reversible fastener system.
Figure 9:
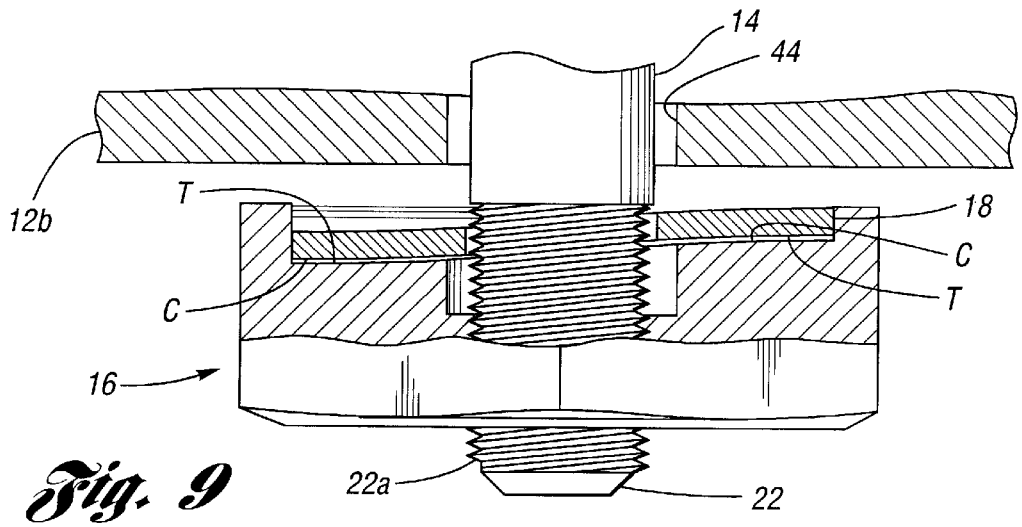
FIGS. 9 through 14 are partly sectional side views of the first preferred embodiment of the reversible fastener system, wherein the nut is shown progressively threadably engaged on the bolt.
Figure 10:
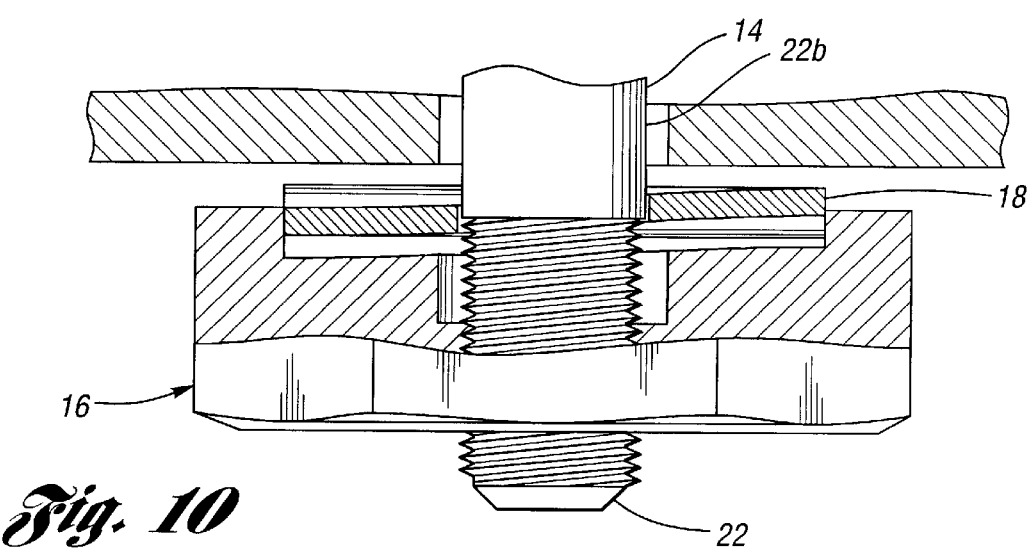
Figure 11:
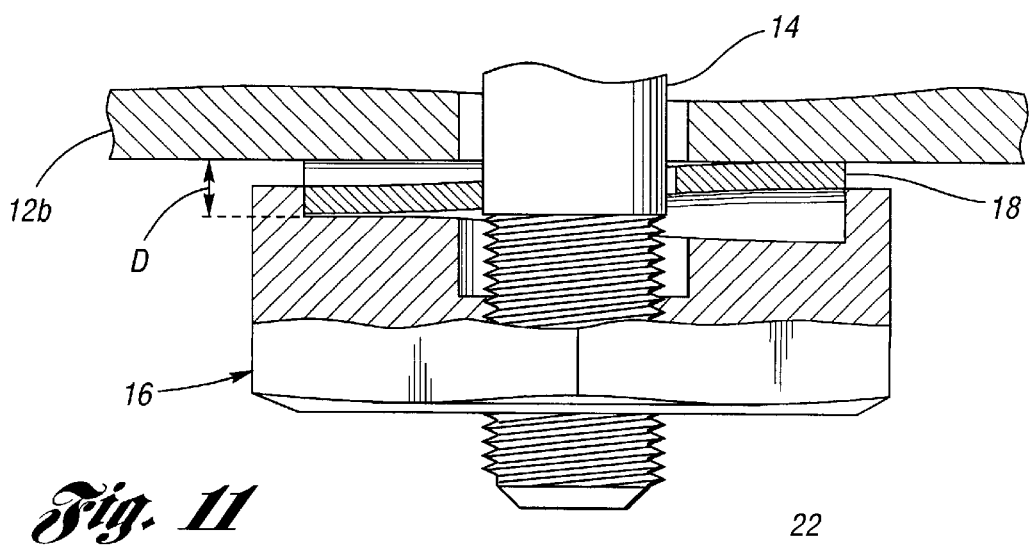
Figure 12:
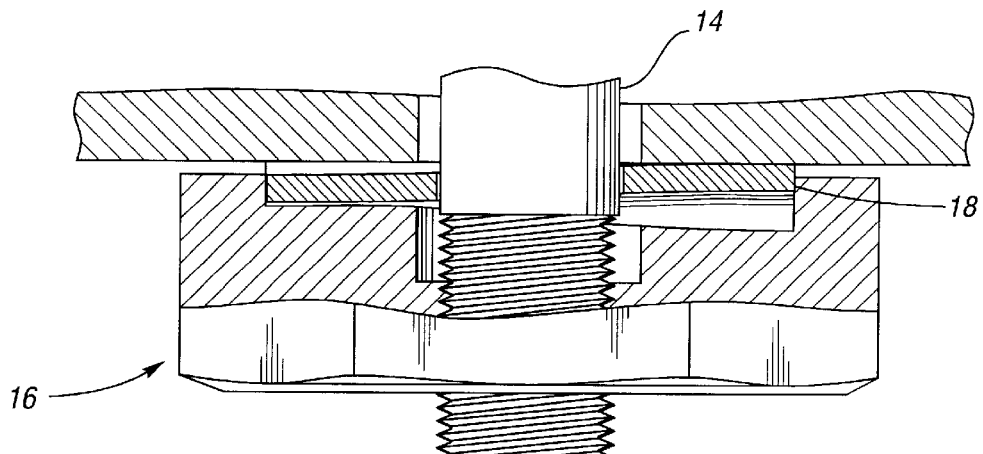

The washer 18 is formed of a planar, elastically deformable material, such as for example spring steel, which is stamped or otherwise formed into a wavy shape characterized by the plurality of washer waves 32. As best shown at FIG. 3, the washer waves on each side are opposite: a crest C on one side is directly opposite a trough T at the other side. Accordingly, the washer 18 is symmetrically reversible.

As shown best at FIG. 2, the nut 16 may have any suitable side face 42, such as derived from an hexagonal shaped nut, for drivingly interfacing with a socket or wrench.

As shown at FIG. 1, in order for the workpiece hole 44 in the workpiece 12 to accommodate the asymmetric cross-section of the upper portion 22b of the shank 22, the workpiece hole has a diameter at least as great as the widest diameter of the upper portion 22b (in which case the bolt may turn with respect to the workpiece); or else the workpiece hole 44 is complementarily shaped like that of the washer hole 30 (in which case the bolt cannot turn with respect to the workpiece).

Referring now to FIGS. 1 and 9 through 14 the operation of the reversible threaded fastener system 10 will be detailed.

The shank 22 is placed through a workpiece hole 44 in a workpiece 12, as shown at FIG. 1. The washer 18 is placed onto the shank 22 and the nut 16 is loosely threaded onto the threaded portion 22a. Initially, a crests-in-troughs placement of the washer upon the nut may naturally occur as long as the washer is able to rotate with the nut, as at FIG. 9.

When the hole 30 of the washer meets the asymmetrical upper portion 22b, the washer stops rotating with respect to the bolt 14 as the nut is turned threadingly up the bolt. Initially, there is enough clearance for the crests to pass over each other without deformation of the washer, as at FIG. 10. However, once the crest to crest clearance D becomes zero (that is, the distance between the workpiece and the crests of the nut waves equals the crest to crest thickness of the washer), any further rotation of the nut on the shank will result in the crests of the washer waves interferingly abutting the crests of the nut waves, and thereupon require the washer to deform wherever a crest of the washer waves meets a crest of the washer waves, as at FIG. 11.

As the nut is further turned, the washer is forced to deform as crests move out of troughs and crests of the washer waves pass over crests of the nut waves. This results in the washer undergoing periodic reversible deformation wherein the crests of the washer waves are caused to be less accentuated (ie., flattened), as in FIG. 12. External energy must be introduced to cause the washer waves to flatten, resulting in a series of ever deepening potential energy wells as each crest finds a corresponding trough where in the crests of the washer waves are able to resiliently relax.

Figure 13:
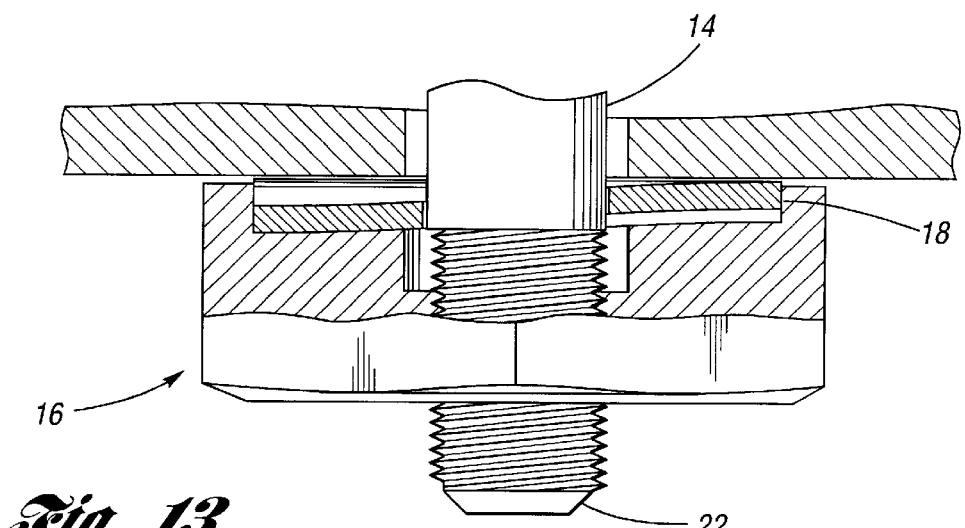
Figure 14:
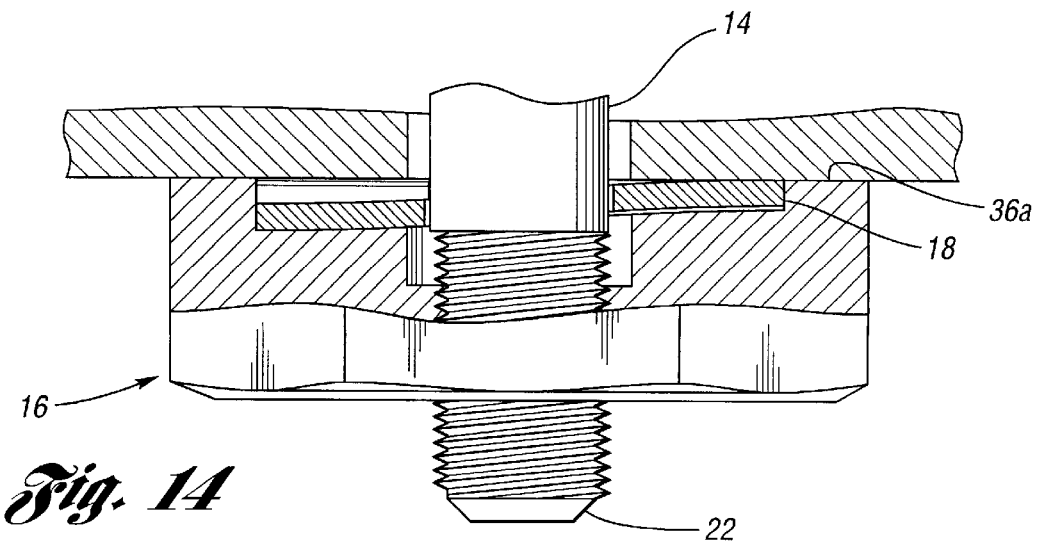

As the nut is still further turned, the crests of the washer waves must be almost entirely straightened in order to pass over the crests of the nut waves. Now when the crests are nested in troughs, a very sizable potential energy well is provided which is easily capable of retaining the nut in a fixed relationship with respect to the bolt, even if the nut is not frictionally engaged, as shown at FIG. 13.

Further turning of the nut results in the nut contacting the workpiece 12, whereupon the abutment face 36a of the annular flange 36 is firmly pressed against the workpiece. Now, as shown simultaneously at FIGS. 1 and 14, the workpiece 12 is held firmly together in the manner of a nut threaded onto a bolt, yet the nut is held fast by action not simply of friction, but of the potential energy wells arising under the interfacing of the nut waves and washer waves. Indeed, to facilitate threading of the nut, a lubricant may be used which lubricant may render friction a negligible factor in holding the nut fixed in relation to the bolt.

Figure 15:
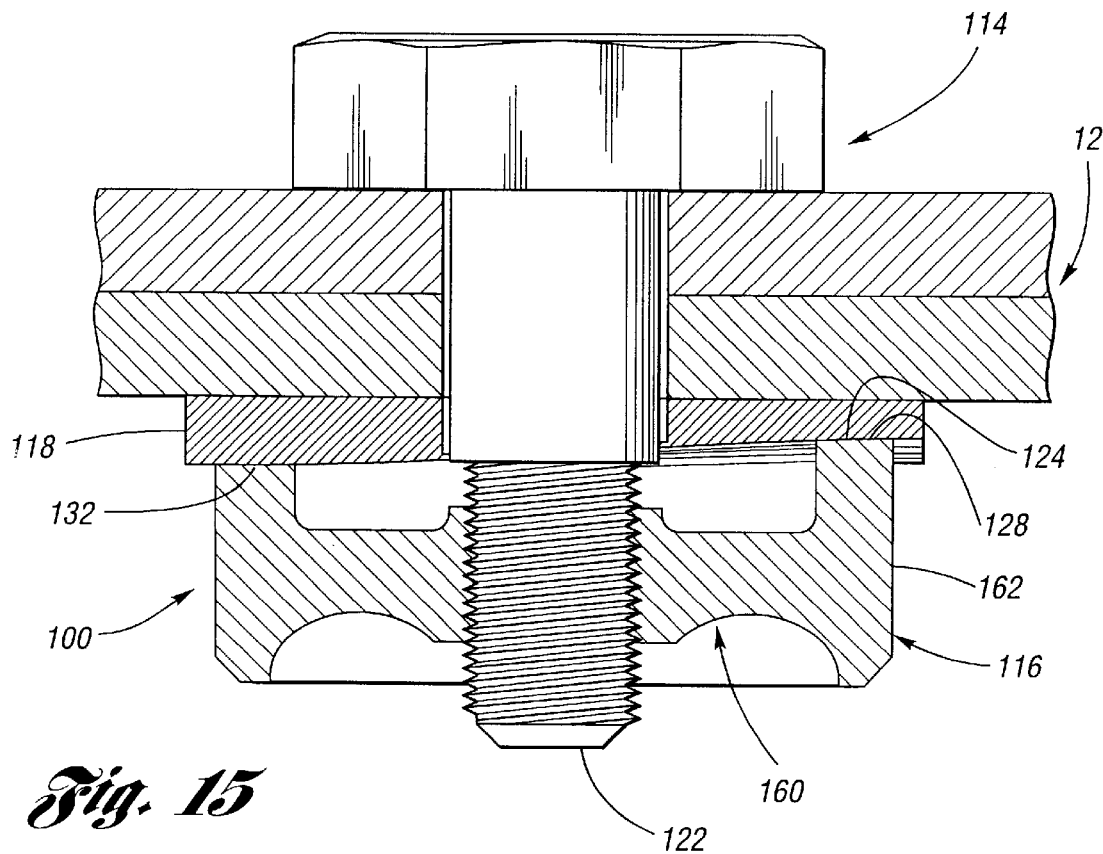
FIG. 15 is a partly sectional side view of a second preferred embodiment of a reversible fastener system according to the present invention.

Referring now to FIG. 15, a second preferred embodiment of the reversible threaded fastener system 100 is shown with respect to a workpiece 12. The nut 116 is provided with a plurality of radial nut waves 128 which correspond to the washer waves 132, the washer 118 is not resiliently deformable, and the nut is resiliently deformable. Resilient deformability of the nut 116 transpires at a central disk 160, and the nut interfaces with the washer at a barrel 162. The barrel 162 has an inner face 124 which carries the nut waves 128.

When crests of the washer waves 132 are interferingly abutting crests of the nut waves 128 as the nut 116 is rotated threadingly up the shank 122, the central disk 160 resiliently flexes so that the barrel 162 adjacent each of the nut waves axially moves away from the workpiece, permitting clearance for the washer crests to pass over the nut crests.

In operation, as the nut is threaded onto the the shank, the crests of the nut waves pass over crests of the washer waves, due to the requirement that the washer be rotatively stationary with respect to the bolt. When the nut reaches a fully conjoined state on the bolt, as shown at FIG. 15, the crests of the nut waves will be seated into corresponding troughs of the washer waves (and the troughs of the nut waves will be similarly seated into corresponding crests of the washer waves). At this relative position, the crests-in-troughs arrangement presents a potential energy well in which the central disk 160 is at least partially relaxed. The potential energy well requires an energy input to resiliently deform the central disk in order for the nut to reverse thread. That is, crests must move out from the troughs and over crests during which process the washer must be increasingly deformed. The requirement that the nut be increasingly deformed in order for the crests to move out from the troughs creates the potential energy well situation that retains the nut in place on the bolt even in the face of vibratory conditions. And, this is so even where the nut is not tightly engaged on the bolt, since it is elastic deformation rather than friction that is at work to retain the nut in place on the bolt.

Figure 16:
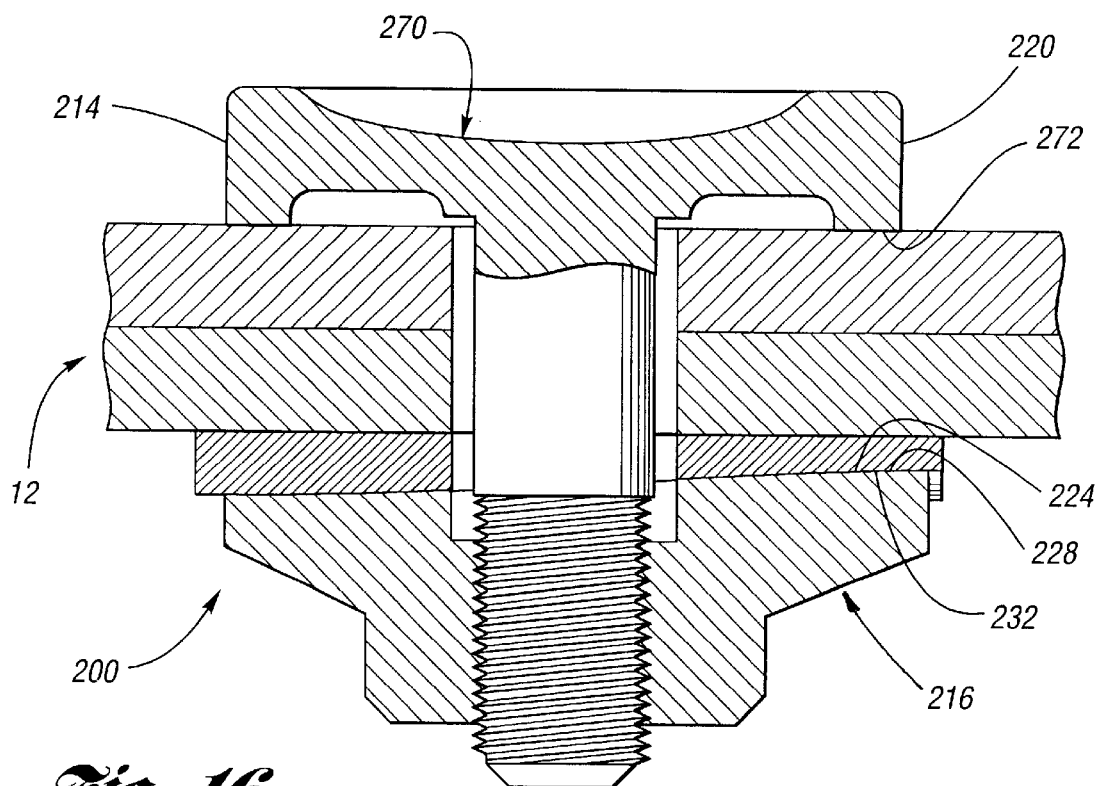
FIG. 16 is a partly sectional side view of a third preferred embodiment of a reversible fastener system according to the present invention.

Referring now to FIG. 16, a third preferred embodiment of the reversible threaded fastener system 200 is shown with respect to a workpiece 12. The nut 216 is provided with a plurality of radial nut waves 228 which correspond to the washer waves 232, the washer is not resiliently deformable, the nut is not resiliently deformable, and the head 220 of the bolt 214 is resiliently deformable. Resilient deformability of the head 220 transpires at a concavely excavated central plate 270, and the head interfaces with the workpiece 12 at an annular rim 272. The nut 216 has an inner face 224 which carries the nut waves 228.

When crests of the washer waves 232 are interferingly abutting crests of the nut waves 228 as the nut 216 is rotated threadingly up the shank of the bolt 214, the central plate 270 resiliently flexes so that the annular rim 272 adjacent each of the nut waves axially moves away from the workpiece, permitting clearance for the washer crests to pass over the nut crests.

In operation, as the nut is threaded onto the the shank, the crests of the nut waves pass over the crests of the washer waves, due to the requirement that the washer be rotatively stationary with respect to the bolt. When the nut reaches a fully conjoined state on the bolt, the crests of the nut waves will be seated into corresponding troughs of the washer waves (and the troughs of the nut waves will be similarly seated into corresponding crests of the washer waves). At this relative position, the crests-in-troughs arrangement presents a potential energy well in which the central plate 270 is at least partially relaxed. The potential energy well requires an energy input to resiliently deform the central plate in order for the nut to reverse thread. That is, crests must move out from the troughs and over crests during which process the head 220 must be increasingly deformed. The requirement that the head be increasing deformed in order for the crests to move out from the troughs creates the potential energy well situation that retains the nut in place on the bolt even in the face of vibratory conditions. And, this is so even wherein the nut is not tightly engaged on the bolt, since it is elastic deformation rather than friction that is at work to retain the nut in place on the bolt.

It is to be understood that resilient deformation in response to crests of washer waves interf eringly abutting crests of nut waves so as to permit the crests of the washer waves to pass over the crests of the nut waves may be provided by any resiliently deformable agency. For example, not only may the washer, the nut, or the bolt have resiliently deformability, the workpiece, itself may provide resilient deformability. For example, the workpiece may be composed of a resiliently deformable material, or a resiliently deformable material may abut the workpiece on either side of therebetween. In any case, the reversible threaded fastener system provides non-destructive, reversible threading of the nut with respect to the shank, while yet retaining the nut via the aforesaid potential energy well situation.

While the preferred materials of the bolts, washer and nut of the reversible threaded fastener system according to the present invention is metal, plastic or other materials may also be utilized in whole or in combination.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A reversible threaded fastener system comprising:

shank means for providing a shank, at least a portion of said shank being threaded;

a nut having a threaded bore for threadingly rotating on said shank, said nut further having an inner face provided with a plurality of nut waves characterized by radially disposed crests and troughs;

a washer having a hole for receiving said shank, said washer having radially disposed washer waves characterized by radially disposed crests and waves, wherein said nut waves and said washer waves are complementary to each other so that the crests thereof are nestable into the troughs thereof;

retention means for retaining said washer from rotating with respect to said shank; and resiliency means for resiliently deforming in response to crests of said nut waves interferingly abutting crests of said washer waves as said nut is threadingly rotated on said shank, wherein the resilient deformation enables the crests of said washer waves to pass over the crests of the nut waves;

wherein said resiliency means comprises at least one of said washer, said nut and said shank means being resilienttly deformed by the interfering abutment of the crests.

2. The reversible threaded fastener system of claim 1, wherein said retention means comprises an asymmetric coupling between said shank and said washer.

3. The reversible threaded fastener system of claim 2, wherein said asymmetric coupling comprises a portion of said shank having a predetermined asymmetric shape, and said hole of said washer having a shape complementary to said predetermined asymmetric shape.

4. The reversible threaded fastener system of claim 3, wherein said resiliency means comprises said washer being resiliently deformable.

5. The reversible threaded fastener system of claim 4, wherein said nut has a primary recess at said inner face in concentric relation to said threaded bore; wherein said primary recess carries said nut waves; and wherein said washer is receivable into said primary recess.

6. The reversible threaded fastener system of claim 5, wherein said primary recess forms an annular flange upstanding in relation to said primary recess, said annular flange having an abutment face for abutting a workpiece when said nut is fully conjoined onto said shank.

7. The reversible threaded fastener system of claim 6, wherein said nut has a secondary recess at said inner face concentrically disposed with respect to said threaded bore for receiving said shank at said predetermined asymmetric shape thereof.

8. The reversible threaded fastener system of claim 3, wherein said resiliency means comprises said nut being resiliently deformable.

9. The reversible threaded fastener system of claim 8, wherein said nut further comprises:

a resiliently deformable central disk; and a barrel connected peripherally to said central disk, said barrel carrying said nut waves.

10. The reversible threaded fastener system of claim 3, wherein said resiliency means comprises said bolt being resilently deformable.

11. The reversible threaded fastener system of claim 10, wherein said head comprises:

a resiliently deformable central plate; and an annular rim connected peripherally to said central plate for abutting a workpiece when said nut is fully conjoined onto said shank.

12. A reversible threaded fastener system comprising:

a bolt having a head and a shank, at least a portion of said shank being threaded;

a nut having a threaded bore for threadingly rotating on said shank, said nut further having an inner face provided with a plurality of nut waves characterized by radially disposed crests and troughs;

a washer having a hole for receiving said shank, said washer having radially disposed washer waves characterized by radially disposed crests and waves, wherein said nut waves and said washer waves are complementary to each other so that the crests thereof are nestable into the troughs thereof;

retention means for retaining said washer from rotating with respect to said shank, wherein said retention means comprises an asymmetric coupling between said shank and said washer; and resiliency means for resiliently deforming in response to crests of said nut waves interf eringly abutting crests of said washer waves as said nut is threadingly rotated on said shank, wherein the resilient deformation enables the crests of said washer waves to pass over the crests of the nut waves, wherein said resiliency means comprises at least one of said washer, said nut and said bolt being resiliently deformed by the interfering abutment of the crests.

13. The reversible threaded fastener system of claim 12, wherein said resiliency means comprises said washer being resiliently deformable; wherein said nut has a primary recess at said inner face in concentric relation to said threaded bore; wherein said primary recess carries said nut waves; and wherein said washer is receivable into said primary recess.

14. The reversible threaded fastener system of claim 13, wherein said primary recess forms an annular flange upstanding in relation to said primary recess, said annular flange having an abutment face for abutting a workpiece when said nut is fully conjoined onto said shank.

15. The reversible threaded fastener system of claim 14, wherein said nut has a secondary recess at said inner face concentrically disposed with respect to said threaded bore for receiving said shank at said predetermined asymmetric shape thereof.

16. The reversible threaded fastener system of claim 12, wherein said resiliency means comprises said nut being resiliently deformable, and wherein said nut further comprises:

a resiliently deformable central disk; and a barrel connected peripherally to said central disk, said barrel carrying said nut waves.

17. The reversible threaded fastener system of claim 12, wherein said resiliency means comprises said bolt being resiliently deformable, and wherein said head comprises:

a resiliently deformable central plate; and an annular rim connected peripherally to said central plate for abutting a workpiece when said nut is fully conjoined onto said shank.

18. The reversible threaded fastener system of claim 12, wherein said asymmetric coupling comprises a portion of said shank having a predetermined asymmetric shape, and said hole of said washer having a shape complementary to said predetermined asymmetric shape.

19. A reversible threaded fastener system comprising:

a bolt having a head and a shank, at least a portion of said shank being threaded;

a nut having a threaded bore for threadingly rotating on said shank, said nut further having an inner face provided with a plurality of nut waves characterized by radially disposed crests and troughs;

a washer having a hole for receiving said shank, said washer having radially disposed washer waves characterized by radially disposed crests and waves, wherein said nut waves and said washer waves are complementary to each other so that the crests thereof are nestable into the troughs thereof;

retention means for retaining said washer from rotating with respect to said shank; and resiliency means for resiliently deforming in response to crests of said nut waves interferingly abutting crests of said washer waves as said nut is threadingly rotated on said shank, wherein the resilient deformation enables the crests of said washer waves to pass over the crests of the nut waves, and wherein said resiliency means comprises said washer being resiliently deformable;

wherein said nut has a primary recess at said inner face in concentric relation to said threaded bore; wherein said primary recess carries said nut waves; and wherein said washer is receivable into said primary recess.

\* \* \* \* \*